Figure 6:
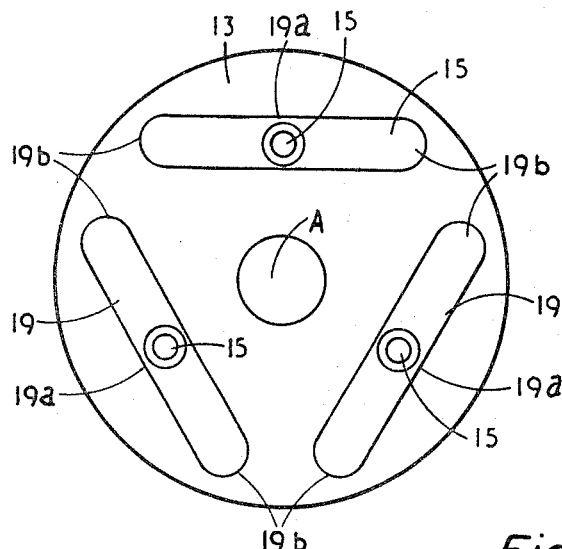

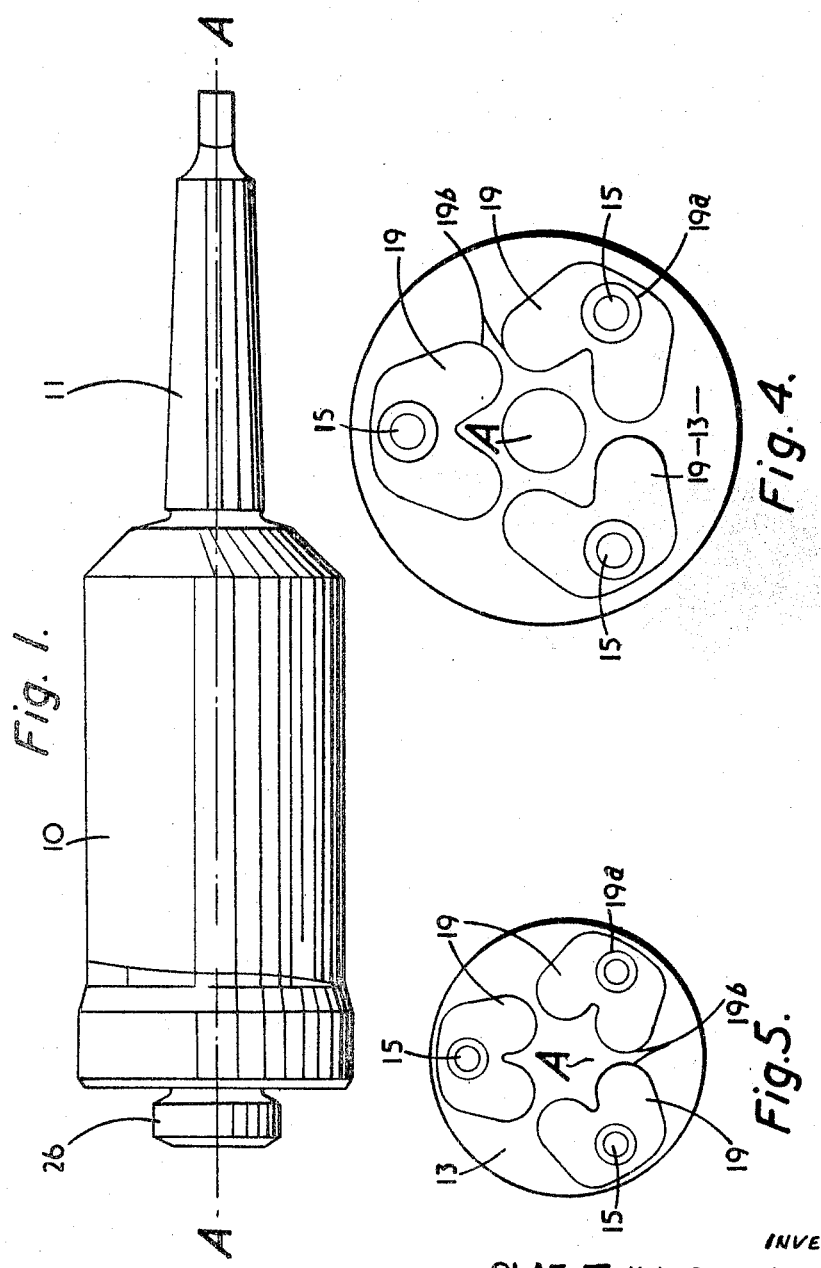

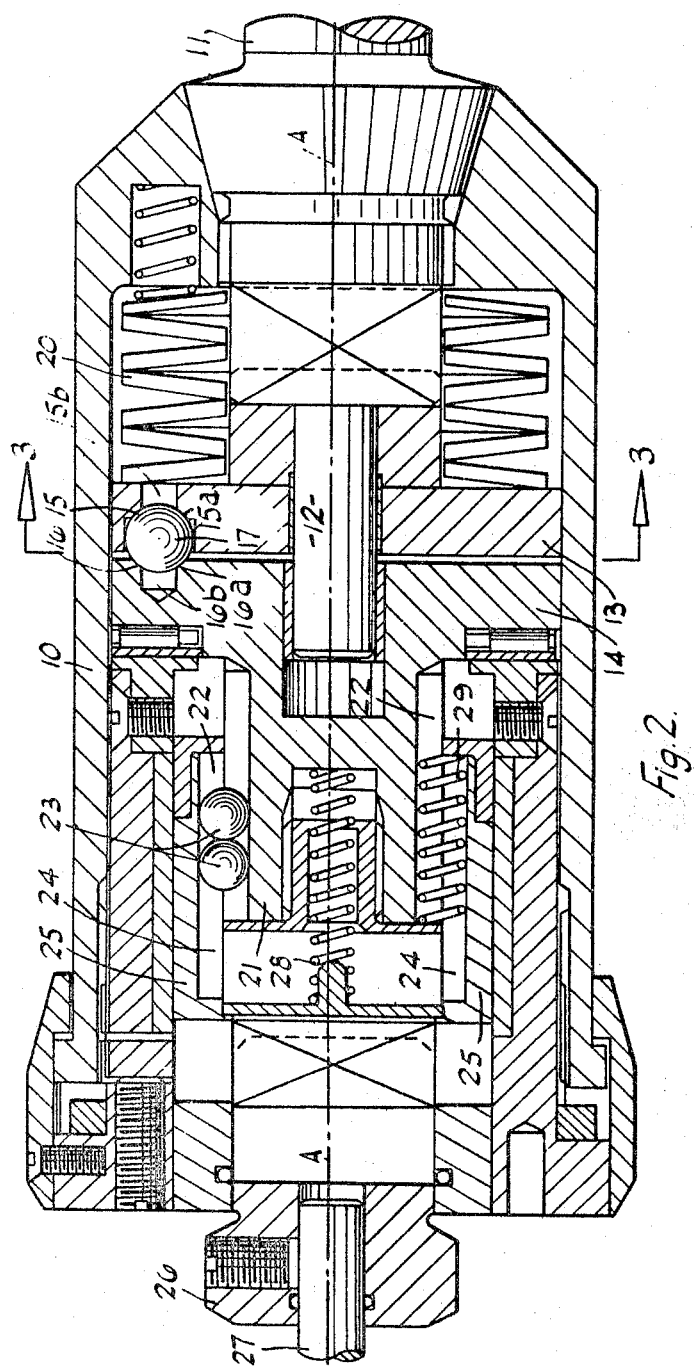

INVENTORS.
OLAF JOHN BARCLAY ORWIN
DAVID JOHN FORTUNE
BY Kurt Kelman Agent

United States Patent Office 3,319,753
Patented May 16, 1967

3,319,753
OVERLOAD CLUTCHES
Olaf John Barclay Orwin, Quinton, Birmingham, and David John Fortune, Weston, Bath, England, assignors to Fisher & Ludlow Limited, Stafford, England, a British company
Filed July 20, 1965, Ser. No. 473,362
Claims priority, application Great Britain, July 30, 1964, 30,271/64; Mar. 16, 1965, 11,005/65, 11,006/65; July 3, 1965, 28,276/65
4 Claims. (Cl. 192—56)

This invention relates to a new and improved overload clutch of the kind comprising driving and driven clutch members, each having a plurality of torque transmitting openings and a plurality of torque transmitting balls, the arrangement being such that when the clutch is transmitting torque, each ball is positioned partially within a driving member opening and also within a corresponding driven member opening, so as thereby to prevent relative rotation between the two clutch members, the two clutch members being mounted for relative axial displacement away from one another against spring or other loading, so as to permit of the balls disengaging from the torque transmitting openings of at least one of the two clutch members and of the latter rotating relatively on more than a predetermined torque being applied to the driving clutch member.

The present invention is an improvement in or modification of the invention, the subject of our prior U.S.A. Patent No. 3,095,955, in the specification of which we have described and claimed an overload clutch of the foregoing kind, such overload clutch comprising driving and driven clutch members coupled together by torque transmitting balls which engage in torque transmitting openings provided in axially opposed faces of said two members, said two members being mounted for relative axial displacement away from one another against loading means urging said members towards one another, so as to permit of the balls moving out of torque transmitting engagement with said openings on more than a predetermined torque being applied to the driving member, with one of said two clutch members being provided with a ball retaining part which rotates with the said one member, which ball retaining part is formed with ball receiving slots, one portion of each of which slots leads into a corresponding torque transmitting opening of said one clutch member, with one end of each slot being out of register with the torque transmitting openings of both clutch members for all relative rotational positions thereof, and the opposed mouths of the openings of both clutch members having a diameter less than the diameter of the balls, and the slots including the portion thereof adjacent the torque transmitting openings having a width greater than the diameter of the balls, the arrangement being such that the balls are free to move out of their torque transmitting position by a rolling movement before being subjected to the guiding action of the slots in displacing the balls along the slots into a position in which they are out of register with said torque transmitting openings.

In the particular arrangement described in the prior specification aforementioned, the portion of each slot which leads into a corresponding torque transmitting opening of the said one clutch member is constituted by one end of the slot, and this means that it is in practice impossible to reverse the direction of rotation of the clutch, except as described in the prior specification by forming the ball retaining part separately from the one clutch member with which it is adapted to rotate, and dismantling the clutch and reversing the position of the ball retaining part, so that as described in the prior specification the one end of each slot which is out of register with the torque transmitting openings of both clutch members is always situated forwardly of the other end of the slot, which is in register with the openings of the associated clutch member.

The present invention has for its object the provision of an improved arrangement which permits of the direction of rotation of the clutch being reversed without it being necessary to dismantle the clutch as above described.

According to the present invention, each of the slots of the ball retaining part of the clutch are so disposed, as at a position intermediate the two ends thereof, and when the clutch is transmitting torque, to be in register with a torque transmitting opening in both clutch members with each of the two opposite ends of each slot being out of register with the torque transmitting openings of both clutch members for all relative rotational positions of said members, the arrangement being such that when the balls move out of torque transmitting engagement with their respective openings they are free to advance along the slots to one or the other end thereof according to the direction of rotation of the driving member of the clutch.

Such an arrangement permits of the same clutch being utilized for transmitting similar torques for either direction of rotation of the driving member without any adjustment of any kind to the clutch being required, whereby an important economy in the distribution of the clutch to the user as well as an important convenience in the operation of the clutch by the user is realised.

At the same time, insofar as the ball retaining part is not required with the present invention to be detached from the clutch member with which it is designed to rotate, such part may be formed integrally with said clutch member instead of being constructed separately therefrom, whereby an important saving in manufacturing cost may be effected.

In one arrangement the slots may be formed as straight slots, the longitudinal axes of which at a position medially of the length thereof are at right angles to the radius line from such mid position to the axis of rotation of the clutch. Such an arrangement possesses the advantage that the slots by reason of their straight configuration may be formed in a particularly simple and inexpensive manner.

Alternatively, in accordance with a further feature of this invention, instead of making the slots of straight configuration, each slot may be so shaped that the two ends thereof are nearer to the axis of rotation of the clutch than that part of each slot intermediate the ends, and which is adapted to register with the torque transmitting openings of both clutch members, considering the clutch engaged.

This latter feature of this invention, in addition to permitting of the obtaining of the first two of the advantages above specified, possesses the further advantage that for a given overall diameter of the ball retaining part, which in practice is usually the same as the overall diameter of the clutch as a whole, a greater torque can be transmitted for a given size and number of balls and strength of loading means, than is possible if, as in the case of a straight slot, the two ends of the slot are situated further from the axis of rotation of the clutch, than the intermediate portion of the slot, which, as is the case where the slots are straight, is registerable with the torque transmitting openings in both clutch members.

The foregoing arises from the fact that the maximum torque which can be transmitted is a function of the radial distance between the balls and the axis of clutch rotation, considering the balls in the torque transmitting position. Thus with a ball retaining part according to this further feature of the present invention, the intermediate portion of each slot in the ball retaining part, together with the torque transmitting openings can be brought as near as possible to the periphery of the clutch, without it being necessary, for the purpose of accommodating the ends of the slots, to increase the overall diameter of the clutch beyond that required to provide for the location of the torque transmitting openings.

This last feature is of especial importance where there are serious limitations on overall size and/or weight of the clutch, for example in applying the clutch to reversible power driven tools, such as power driven tappers, where by reason of limitations of overall size and/or weight, it is most important that the overall diameter of the overload clutch should be kept as low as possible.

Other advantages of this last mentioned feature of the present invention, arising from the fact that the two ends of each slot are nearer to the axis of rotation of the clutch than is the case with the part of the slot intermediate such ends, are as follows:

(a) The residual friction torque transmitted by the pressure engagement between the balls and the two clutch members with the clutch disengaged is reduced by reason of the nearer disposition of the balls to the clutch axis.

(b) As the linear velocity of the balls for a given rate of rotation of the driving member is reduced as the balls move nearer to the clutch axis, the velocity of any relative skidding movement between the balls and the parts with which they may be in pressure engagement with the clutch disengaged is reduced.

(c) The length of the circumferential path through which the balls are bodily rotated with the clutch disengaged is reduced for each revolution of the clutch driving member. Thus, for a given number of revolutions before the driving member is stopped after overload has occurred, the total circular distance through which the balls will have advanced is reduced, thus minimising any wear consequent on any skidding movement between the balls and any surface with which they may be in pressure engagement.

Figure 3:
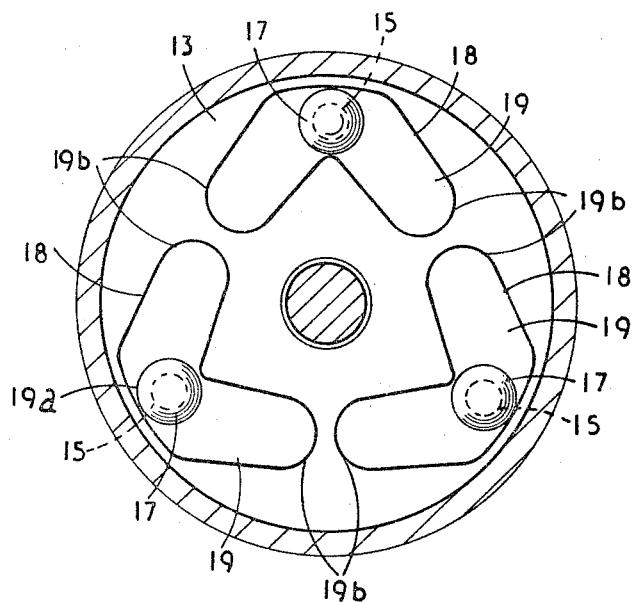

The invention is illustrated in the accompanying drawings, wherein:

FIGURE 1 is a side elevation of one form of thread cutting tapper provided with an overload clutch in accordance with this invention, FIGURE 2 is a cross-sectional view to an enlarged scale of the tapper depicted in FIGURE 1, FIGURE 3 is a sectional view on the line 3—3 of FIGURE 2, FIGURES 4, 5 and 6 are views similar to FIGURE 3, but showing three alternative configurations of ball retaining slots.

Referring firstly to FIGURES 1 to 3 of the drawing the tapper there illustrated comprises an outer hollow cylindrical body 10 mounted on a driving shank 11 having a spigot portion 12 on which is mounted in axially slidable but non-relatively rotatable relationship the disc-like driving member 13 of the clutch.

Mounted for free rotation on the inner end of the spigot 12 is a driven clutch member 14.

The two clutch members 13, 14, are of generally circular configuration and as described more particularly in the prior specification are formed with a series, e.g., three torque transmitting openings 15, 16, respectively; each opening comprising a mouth portion 15a, 16a, of frusto-conical configuration which terminates in an inner cylindrical bore 15b, 16b of lesser diameter.

The openings 15, 16, are respectively adapted to register with one another for one relative rotational position of the two clutch members in which position they are in torque transmitting engagement with a torque transmitting ball 17 as described in the prior specification which balls have a diameter greater than the maximum diameter of the frusto-conical mouths 15a, 16a, respectively.

The driving member 13 at a position nearest the driven member 14 is formed with an integral ball retaining part 18 formed as shown in FIGURE 3 with three ball receiving slots 19.

Each slot 19 is as shown in FIGURE 3, of substantially wide V-configuration having its medial part 19a at a position intermediate the two ends 19b of each slot in register with one of the three torque transmitting openings 15 in the associated driving member 13.

The two ends 19b of each V-shaped slot are disposed at a position nearer to the axis of rotation A of the clutch than the medial part 19a of the slot so as to ensure that each of the two ends 19b of each slot 19 is out of register with the torque transmitting openings 15, 16 for all relative rotational positions of the two clutch members 13, 14.

Such disposition of the two ends 19b of each slot nearer to the axis of rotation of the clutch than the medial part 19a of the slot further ensures that:

(1) The overall diameter of the clutch and thus the overall weight is kept as low as possible.

(2) When the clutch is disengaged, the transmission of minimum residual torque to the driven member 14 consequent on the frictional transmission of torque thereto from the driving member by reason of the pressure contact between the balls and the two clutch members.

(3) A reduction in linear rotational velocity of the balls as these advance to the ends 19b of the slots thereby reducing the effect, in particular the wear effect, of any skidding of the balls against the semi-circular edges 19c at the inner ends of the slots.

(4) As the balls when at the ends of the slots, are nearer to the clutch axis, the circumferential distance through which they move for a given number of rotations of the driving member 13 after overload is reduced with consequent minimising of wear consequent of any skidding effect, as above mentioned.

With the clutch construction as above described, when more than a predetermined torque is exceeded, for either direction of rotation of the driving member 13, the balls 17 can in the manner described in the prior specification disengage themselves from the mouths of the openings 15, 16 and advance along the slots 19 to one or the other of the two ends thereof according to the direction of rotation so as then to be in a position in which they are out of register with the openings 15, 16 for the purpose described in the prior specification.

Each slot 19 has a width slightly greater than the diameter of each ball 17 so that the latter can move freely along the length of the associated slot when disengagement of the clutch occurs and disengagement is also assisted by the fact that the balls 17 are adapted as described in the prior specification to have line engagement with the outer edges 15c, 16c of the frusto-conical mouths to the openings 15, 16.

The driving member 13 is spring urged along spigot 12 by compression spring 20 into torque transmitting engagement with the balls 17 in the manner generally as described in the prior specification, the spring pressure being so chosen that when more than a predetermined torque is applied the driving member 13 moves axially away from the driven member 14 by a distance sufficient to permit of clutch disengagement.

The driven member 14 is formed with an integral sleeve-like portion 21 having a number of peripheral axially extending grooves 22 in which work pairs of ball 23 which engage in corresponding grooves 24 on the inner periphery of cage 25 which is connected to collet 26 in which is inserted the shank of the thread cutting tool 27.

The arrangement is such that the collet is permitted by the provision of the pairs of balls 23 to have limited axial movement relative to the driven member 14 of the clutch with which it is kept in torque transmitting connection through the balls 23 and slots 22, 24, such limited axial movement taking care of any error in initial feeding position of the thread cutting part of the tool in relation to the work. Such axial movement is controlled by compression springs 28, 29 which act oppositely to one another so as to displace the collet 26 in either axial direction beyond the mean position depicted in the drawing.

In FIGURES 4 and 5 are illustrated slight modifications of the ball receiving slots 19 depicted in FIGURE 3, in which the slots are of substantially wide U-configuration instead of wide V-configuration. Such an arrangement possesses the advantage of disposing the two ends 19b of each slot somewhat nearer the axis of the clutch than is the case with the particular configuration shown in FIGURE 3 and thus reduces still further the peripheral velocity of the balls when at the ends of the slots, the advantage of which has already been explained.

In the further modification depicted in FIGURE 6 the ball receiving slots 19 are of straight configuration with their longitudinal axes extending at right angles to a radius line passing through their medial part 19a and through the clutch axis A. Each slot 19 is further of such a length that each end 19b thereof is out of register with the openings 15, 16, for all relative rotational positions of the two clutch members 13, 14.

What we claim then is:
1. An overload clutch comprising:
   (a) driving and driven clutch members,
   (b) means mounting said members for relative rotational movement about a common axis in side-by-side relationship,
   (c) resilient loading means urging said two members towards one another,
   (d) a plurality of torque transmitting balls disposed between said two members,
   (e) each of said two members having a plurality of oppositely directed circular ball engaging openings of diameter less than the diameter of the balls and having line engagement therewith,
   (f) said openings being so disposed as to be in register with one another for specific relative rotational positions of the two clutch members,
   (g) one of said two clutch members having a ball retaining part rotatable therewith,
   (h) said ball retaining part having a plurality of ball guiding slots each receiving one of said balls with the width of said slots being greater than the diameter of the balls therewithin,
   (i) each slot having a medial portion the centre part of which is in register with one of the ball engaging openings of the clutch member with which said ball retaining part is rotatable and each slot having its two ends out of register with said ball engaging openings for all relative rotational positions of the two clutch members,
   (j) said medial portion of each slot extending beyond opposite edges of the ball engaging openings with which it is in register and in a direction tangential to a radius line from the clutch axis to the centre of said medial portion so that each ball is free to roll along the medial portion of its associated slot in a circumferential direction on disengagement from the torque transmitting openings.

2. An overload clutch according to claim 1 further characterised in that the slots in the ball retaining part are formed as straight slots, the longitudinal axes of which at a position medially of the length thereof are at right angles to a radius line from such mid position to the axis of rotation of the clutch.

3. An overload clutch according to claim 1, further characterised in that the slots in the ball retaining part are so formed that the two ends thereof are nearer to the axis of rotation of the clutch than that part of each slot intermediate the ends and which is adapted to register with the torque transmitting openings of both clutch members, considering the clutch engaged.

4. An overload clutch according to claim 3, characterised in that each slot is of substantially diverging channel shape in configuration, with the base or apex of the channel respectively constituting the intermediate portion of each slot which is adapted to register with the torque transmitting openings in both clutch members, with the clutch engaged, and with the extremities of the two limbs constituting the ends of the slots.

References Cited by the Examiner
UNITED STATES PATENTS

| | | | |
|---|---|---|---|
| 2,182,627 | 12/1939 | Gauld | 192—56 |
| 2,257,759 | 10/1941 | Niemann | 192—56 |
| 2,490,172 | 12/1949 | Swahnberg | 192—56 X |
| 2,508,061 | 5/1950 | Fish | 192—56 |
| 2,969,132 | 1/1961 | Stewart | 192—56 |

DAVID J. WILLIAMOWSKY, *Primary Examiner.*

ARTHUR T. McKEON, *Examiner.*